(12) United States Patent
Yamazaki et al.

(10) Patent No.: US 10,632,986 B2
(45) Date of Patent: Apr. 28, 2020

(54) TORQUE DISTURBANCE MANAGEMENT SYSTEM AND METHOD

(71) Applicant: Ford Global Technologies, LLC, Dearborn, MI (US)

(72) Inventors: Mark Steven Yamazaki, Canton, MI (US); Chen Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 525 days.

(21) Appl. No.: 15/426,654

(22) Filed: Feb. 7, 2017

(65) Prior Publication Data

US 2018/0222468 A1    Aug. 9, 2018

(51) Int. Cl.

| B60W 20/13 | (2016.01) |
| B60K 6/54  | (2007.10) |
| B60W 10/06 | (2006.01) |
| B60W 10/08 | (2006.01) |
| B60W 50/00 | (2006.01) |
| B60K 6/48  | (2007.10) |

(52) U.S. Cl.
CPC ............... *B60W 20/13* (2016.01); *B60K 6/54* (2013.01); *B60W 10/06* (2013.01); *B60W 10/08* (2013.01); *B60W 50/0098* (2013.01); *B60K 2006/4825* (2013.01); *B60W 2050/0083* (2013.01); *B60W 2540/10* (2013.01); *B60W 2710/0666* (2013.01); *B60W 2710/083* (2013.01); *B60W 2710/244* (2013.01); *Y02T 10/6234* (2013.01); *Y02T 10/6286* (2013.01)

(58) Field of Classification Search
USPC .......................................................... 701/22
See application file for complete search history.

(56) References Cited

U.S. PATENT DOCUMENTS

| 8,140,206 B2 | 3/2012 | Bailey et al. |
| 8,509,974 B2 | 8/2013 | Sujan et al. |
| 2012/0046812 A1* | 2/2012 | Sujan ..................... B60W 10/06 701/22 |
| 2015/0105947 A1* | 4/2015 | Chang ..................... B60L 58/12 701/22 |
| 2017/0370309 A1* | 12/2017 | Serrano ............... B60W 10/023 |

* cited by examiner

*Primary Examiner* — James M McPherson
(74) *Attorney, Agent, or Firm* — David B. Kelley; Brooks Kushman P.C.

(57) ABSTRACT

A hybrid electric vehicle has a powertrain including an internal combustion engine, an electric machine, and a transmission coupled to controller(s) that control torque disturbances arising from changing output torques of the engine, electric machine, and transmission. A torque disturbance threshold is adjusted for driver comfort, and is used to respond to torque demand signals from the vehicle systems, including a battery charging subsystem, and a driver. The controller(s) respond to battery charge and driver demand torque signals, among others, and adjust engine and electric machine torque at a controlled rate and magnitude, using charge-torque-slew-rate, charge-torque, and other limits. Battery charging is similarly managed. The slew-rate, charge-torque, and other limits are adjusted as the torque disturbance threshold changes in response to changing performance of vehicle components, which thereby controls torque disturbances to be lower than the torque disturbance threshold for a plurality of engine, electric machine, and transmission operating conditions.

9 Claims, 5 Drawing Sheets

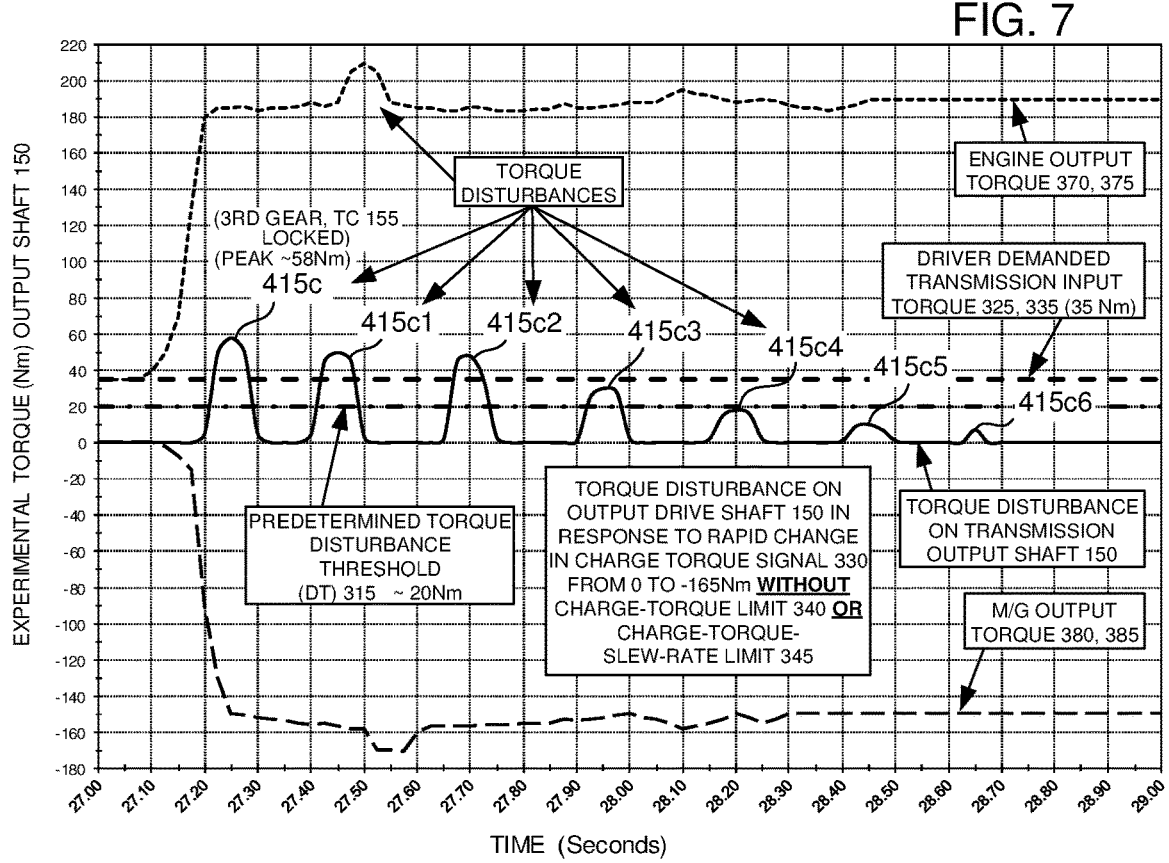
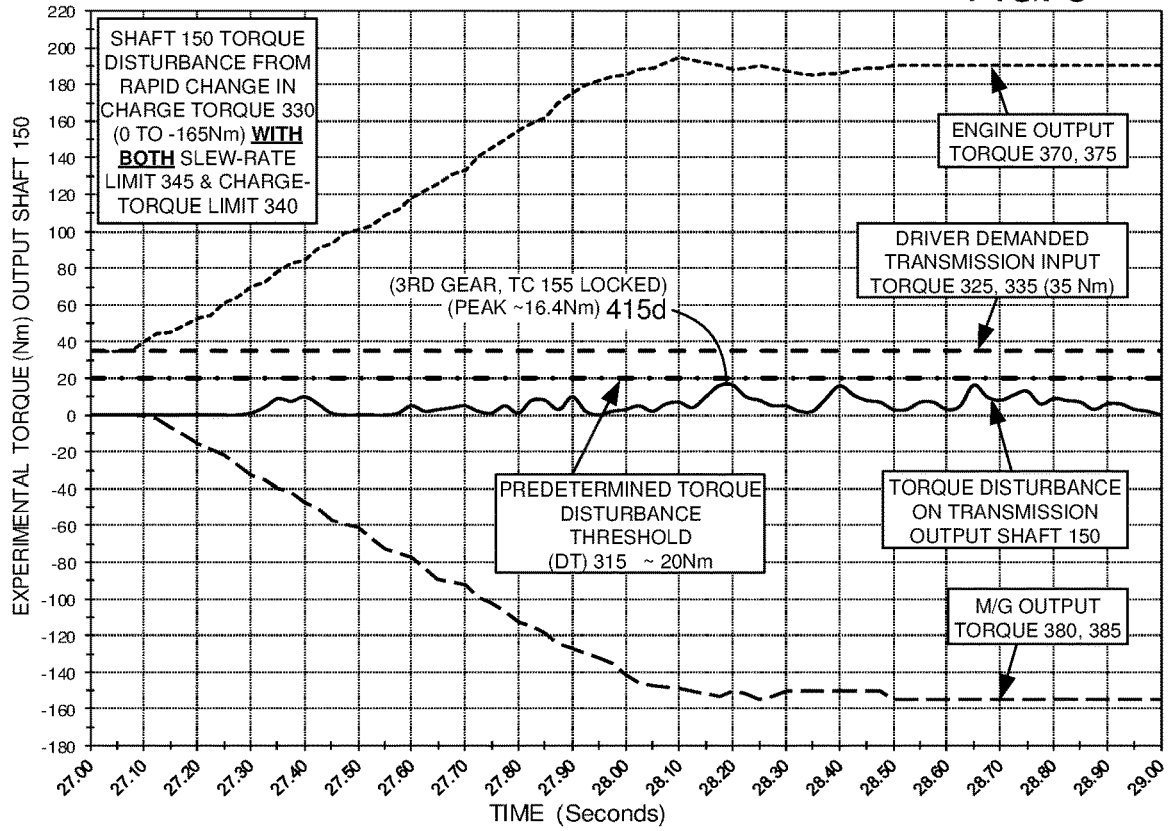

TORQUE DISTURBANCE MANAGEMENT SYSTEM AND METHOD

TECHNICAL FIELD

The present disclosure relates generally to systems and methods for control of torque disturbances in a powertrain of a vehicle.

BACKGROUND

Hybrid electric vehicles (HEVs) have a powertrain that includes an internal combustion engine (ICE) and an electric machine or electric motor generator/starter (M/G), which generate power and torque to propel the vehicle. Such HEVs may sometimes further include second and later generation transmissions that include various configurations enabling advanced operations and improved performance. Such engine, electric machine, and transmission components may introduce torque disturbances to a vehicle driveline related to differing torque delivery characteristics between such components. Such components may be further affected by environmental operating conditions that can include temperature, barometric pressure, engine fuel inconsistencies, and control system idiosyncrasies.

SUMMARY

A vehicle and methods of operation according to the present disclosure include a driveline with a powertrain having an engine and an electric machine coupled with a clutch, and coupled to a battery or other power storage device. A vehicle driveline includes and is powered by the powertrain, which also includes a transmission and torque convertor with a bypass or launch clutch that couples the powertrain to drive shafts and wheels, among other components. The vehicle further includes one or more controllers coupled to the driveline and powertrain that are configured to respond to driver and battery charge demands that are converted to, among other parameters and signals, a charge-torque signal, and to adjust charge-torque and slew-rate limits respectively with a torque-disturbance threshold and a slew-rate-calibration ratio. In response to a driver demand torque, the controller(s) also adjust, at the charge-torque-slew-rate limit, an engine torque to a combination of a driver demand torque and a charge torque, the charge torque being constrained by and/or less than or equal to approximately the charge-torque limit, such that a battery-charge-rate increases as the torque-disturbance threshold increases.

In other variations, the vehicle includes the controller(s) further configured to respond to driver demand torque and the charge-torque signal, and to adjust and/or generate: (a) an engine torque signal combining the driver demand torque and the charge torque, (b) an engine torque-output-estimate signal with or from an engine speed, air intake, and fuel consumption, among other parameters; and (c) an electric machine torque signal to be equal to the engine torque-output-estimate signal minus the driver demand torque. The controller also adjusts the engine and the electric machine, respectively, with the engine torque and electric machine torque signals, to thereby control a transmission-torque output disturbance to be constrained by and/or approximately less than or equal to the torque disturbance threshold.

The transmission may include configurations having a plurality of selectable gears, and may incorporate and/or be coupled with a torque convertor having a bypass clutch. For these arrangements, the controller(s) adjust the torque disturbance threshold with a transmission input speed, and a transmission-torque-multiplier ratio that is further adjusted by the transmission input speed and a selected gear of the plurality. In any of these modifications, the controller(s) may be further configured to adjust, and for example to increase the torque disturbance threshold as the transmission-torque-multiplier ratio decreases, and to also adjust, and for example to increase the charge-torque and slew-rate limits as the torque disturbance threshold increases, such that a battery-charge-rate increases as the transmission-torque-ratio increases.

The vehicle may also further include the powertrain that includes the engine, the electric machine, and the transmission, which are coupled with the torque convertor incorporating one or more of the bypass clutch and/or a launch clutch. The transmission or the torque convertor or both have a transmission-torque-multiplier ratio that is adjustable by the controller(s) with and/or from a speed or torque ratio of the torque convertor, an engagement position of the bypass clutch, and a selected gear of the plurality, among other capabilities. The torque disturbance threshold is also adjustable to increase or decrease with or from a transmission input speed and the transmission-torque-multiplier ratio. Here too, the battery-charge-rate increases as the torque-disturbance threshold increases and as high gears with low torque-ratios are selected from the plurality of gears.

The torque disturbance threshold is adjustable and may be increased or decreased in response to various operating conditions. For example, torque disturbance threshold may be adjusted, and for example may be increased the when one or more of: (a) the bypass clutch is engaged, or partially engaged, (b) the torque convertor operates at a torque ratio of less than or equal to a pre-determined or pre-selected ratio that may be, for example without limitation, approximately 1.2, or higher or lower, and (c) the transmission-torque-multiplier ratio is less than or equal a pre-determined or pre-selected ratio that may be a torque-multiplier ratio of approximately 1.5, or higher or lower. In this adaptation, the controller(s) may further adjust the charge-torque and slew-rate limits as the torque disturbance threshold changes. For example, the charge-torque and slew-rate limits may be increased as the torque disturbance threshold also increases, and decreased as the torque disturbance threshold decreases.

The vehicle also includes a battery coupled to the electric machine and other components, and the controller(s), which controller(s) receive a battery state of charge or charge state. The battery is configured with an optimal charge state, which the controller(s) are configured to detect and maintain in view of the battery instantaneous charge state. The controller(s) use these parameters and signals to generate or establish a charge demand. The controllers convert the charge demand to the charge torque demand/signal so that it is less than or equal to approximately and/or constrained by the charge-torque limit, which enables the engine and electric machine to generate electrical power to charge the battery, whereby the battery-charge-rate is increased as the charge torque demand and charge-torque limit increase.

The slew-rate-calibration ratio is also adjusted by the controllers with a transmission-torque-multiplier ratio and the torque disturbance threshold. The controllers adjust the charge-torque-slew-rate limit with the slew-rate-calibration ratio, and adjust the charge-torque limit with the torque disturbance threshold and the transmission-torque-multiplier ratio. For example, the slew-rate and charge-torque limits may be adjusted higher and lower, and may be increased, as the torque disturbance threshold is increased in response to the transmission-torque-multiplier ratio decreasing.

With these adjustments, the controllers are further also configured to generate: (a) an engine torque signal that is constrained by and/or less than or equal to approximately the charge-torque limit and which combines the driver demanded torque and the charge torque, (b) an engine output-torque-estimate from the one or more of engine speed, air intake, and fuel consumption, and (c) an electric machine signal equal to the engine torque signal minus the engine-output-torque-estimate. These signals and adjustments are further utilized by the controllers to adjust the engine and electric machine torques with the respective engine torque and electric machine signals. The controllers then also adjust the transmission output torque to thereby control and limit torque disturbances to be constrained by and/or less than or equal to approximately the torque disturbance threshold for a plurality of transmission-torque-multiplier ratios.

The vehicle of the present disclosure also contemplates methods of operation of each of the preceding configurations and variations, which include, among others, controller(s) responding to charge and driver demand torque signals and commanding the engine torque to be adjusted at a charge-torque-slew-rate limit, so that the engine torque is approximately equal to a combined driver demand torque and charge torque, which is constrained by and/or does not exceed a charge-torque limit. The controller(s) in this arrangement, may be configured to distribute workload and send commands to other controllers or vehicle systems, and may also directly send commands to various vehicle components. The controller(s) also command the slew-rate and charge-torque limits to be increased when the torque disturbance threshold is increased as the transmission-torque-multiplier ratio decreases, and to also command the decrease of the slew-rate and charge-torque limits in response to the torque disturbance threshold decreasing when the transmission-torque-multiplier ratio increases.

Various vehicle components and other controllers may be commanded to generate various control signals and parameters. For example, responsive to the driver demand torque and the charge-torque signal, the controller(s) may be configured for generating and/or may command other controllers to enable generating: (a) an engine torque signal that combines the driver demand torque and the charge torque, (b) an engine torque-output-estimate signal using information from an engine speed, an air intake, and a fuel consumption, and (c) an electric machine torque signal equal to the engine torque-output-estimate signal minus the driver demand torque. This variation also includes the controller(s) configured for further commanding the engine and the electric machine respectively with the engine torque and electric machine torque signals. In other examples, the controller(s) are modified for adjusting the torque disturbance threshold with a transmission input speed and a transmission-torque-multiplier ratio that is adjusted using the transmission input speed and a selected gear of the plurality. These controllers also may be configured for increasing the torque disturbance threshold as the transmission-torque-multiplier ratio decreases, and for increasing the charge-torque and slew-rate limits as the torque disturbance threshold increases.

This summary of the implementations and configurations of these vehicles and methods of operation describe in less technically detailed variations, several exemplary arrangements for the embodiments of this disclosure, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example configurations, as is further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like and similar reference numbers refer to similar, related, and/or identical elements throughout the figures. The figures and annotations thereon are provided to facilitate understanding of the disclosure without limiting the breadth, scope, scale, or applicability of the disclosure. The drawings are not necessarily made to scale and may be schematic diagrams intended to describe the disclosure to those knowledgeable in the relevant fields of technology.

FIG. 7 reflects experimental dynamometer performance data of the vehicle and systems described herein and in the preceding figures; and FIG. 8 describes further exemplary dynamometer performance data from additional experiments with the vehicle and systems described earlier and reflected in prior figures.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to produce embodiments that should be apparent to and within the knowledge of those skilled in the art, but which may not be explicitly illustrated or described. The combinations of features illustrated here are representative embodiments for many typical applications. Various combinations and modifications of the features consistent with the teachings of this disclosure, however, could be desired for particular applications or implementations, and should be readily within the knowledge, skill, and ability of those working in the relevant fields of technology.

Figure 1:
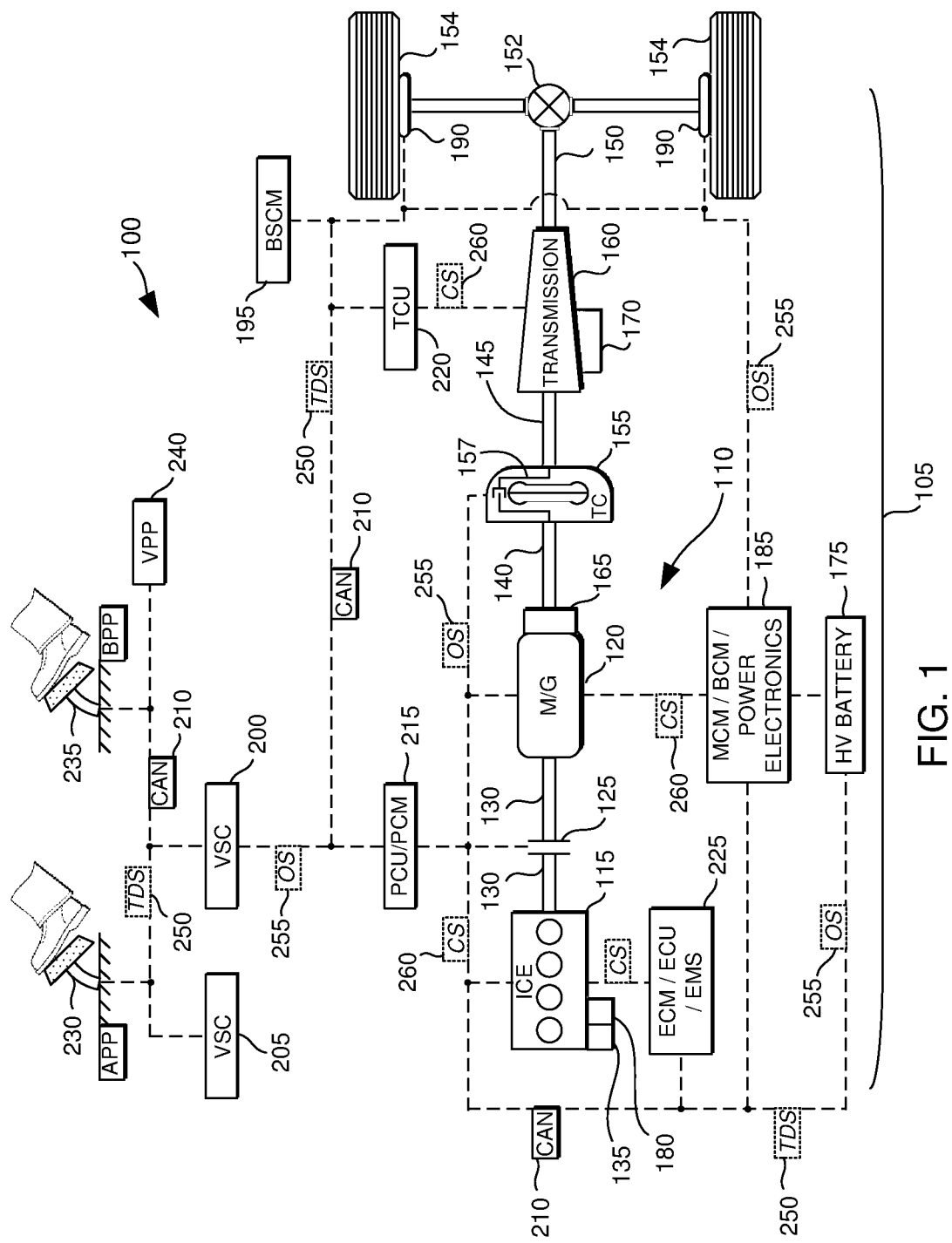
FIG. 1 is an illustration of a hybrid electric vehicle and its systems, components, sensors, actuators, and methods of operation.

With reference now to the various figures and illustrations and to FIGS. 1, 2, 3, 4, 5, 6, 7, and 8, and specifically now to FIG. 1, a schematic diagram of a hybrid electric vehicle (HEV) 100 is shown, and illustrates representative relationships among components of HEV 100. Physical placement and orientation of the components within vehicle 100 may vary. Vehicle 100 includes a driveline 105 that has a powertrain 110, which includes an internal combustion engine (ICE) 115 and an electric machine or electric motor/generator/starter (M/G) 120, which generate power and torque to propel vehicle 100. Engine 115 is a gasoline, diesel, biofuel, natural gas, or alternative fuel powered engine, or a fuel cell, which generates an output torque in addition to other forms of electrical, vacuum, pressure, and hydraulic power by way of front end engine accessories described elsewhere herein. Engine 115 is coupled to electric machine or M/G 120 with a disconnect clutch 125. Engine 115 generates such power and associated engine output torque for transmission to M/G 120 when disconnect clutch 125 is at least partially engaged.

M/G 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to M/G 120 to enable operation as an electric generator, and to other components of vehicle 100. Similarly, M/G 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, M/G 120 may assist engine 115 in a "hybrid electric mode" or an "electric assist mode" by transmitting additional power and torque to turn drive shafts 130 and 140. Also, M/G 120 may operate in an electric only mode wherein engine 115 is decoupled by disconnect clutch 125 and shut down, enabling M/G 120 to transmit positive or negative torque to M/G drive shaft 140. When in generator mode, M/G 120 may also be commanded to produce negative torque and to thereby generate electricity for charging batteries and powering vehicle electrical systems, while engine 115 is generating propulsion power for vehicle 100. M/G 120 also may enable regenerative braking by converting rotational energy from decelerating powertrain 110 and/or wheels 154 into electrical energy for storage, as described in more detail below, in one or more batteries 175, 180.

Disconnect clutch 125 may be disengaged to enable engine 115 to stop or to run independently for powering engine accessories, while M/G 120 generates drive power and torque to propel vehicle 100 via M/G drive shaft 140, torque convertor drive shaft 145, and transmission output drive shaft 150. In other arrangements, both engine 115 and M/G 120 may operate with disconnect clutch 125 fully or partially engaged to cooperatively propel vehicle 100 through drive shafts 130, 140, 150, differential 152, and wheels 154. Differential 152 may transmit approximately equal torque to each wheel 154 and accommodates slight speed differences to enable the vehicle to turn and maneuver. Different types of differentials or similar devices may be used to distribute equal and/or unequal torque from powertrain 110 to wheels 154, for rear-dive, front-drive, and all-wheel drive vehicles. In some vehicles, differential torque distribution may be controlled and varied to enable desired operating modes or conditions wherein each vehicle wheel 154 receives different torque.

Drive shaft 130 of engine 115 and M/G 120 may be a continuous, single, through shaft that is part of and integral with M/G drive shaft 140, or may be a separate, independent drive shaft 130 that may be configured to turn independently of M/G drive shaft 140, for powertrains 110 that include multiple, inline, or otherwise coupled M/G 120 configurations. The schematic of FIG. 1 also contemplates alternative configurations with more than one engine 115 and/or M/G 120, which may be offset from drive shafts 130, 140, and where one or more of engines 115 and M/Gs 120 are positioned in series and/or in parallel elsewhere in driveline 105, such as between or as part of a torque convertor and a transmission, off-axis from the drive shafts, and/or elsewhere and in other arrangements. Still other variations are contemplated without deviating from the scope of the present disclosure.

Driveline 105 and powertrain 110 also include a torque convertor (TC) 155, which couples engine 115 and M/G 120 of powertrain 110 with and/or to a transmission 160. Transmission 160 may be a multiple step-ratio, and/or a multiple and variable torque-multiplier-ratio, automatic and/or manual transmission or gearbox 160 having a plurality of selectable gears. TC 155 may further incorporate a bypass clutch and clutch lock 157 that may also operate as a launch clutch, to enable further control and conditioning of the power and torque transmitted from powertrain 110 to other components of vehicle 100. Transmission 160 may include TC 155 and bypass clutch 157 to be integral with transmission 160 in some variations.

TC 155 incorporates an impeller fixed to M/G drive shaft 140 and a turbine fixed to TC drive shaft 145. The TC 155 establishes a hydraulic or hydrodynamic coupling between drive shafts 140 and 145, which transmits power from the impeller to the turbine when the impeller rotates faster than the turbine. The magnitudes of the turbine and impeller torques depend upon the relative speeds and accelerations. When the ratio of impeller speed to turbine speed is sufficiently high, TC 155 performs as a torque multiplier whereby turbine torque is a multiple of the impeller torque.

TC bypass clutch 157, which may also sometimes be referred to as a torque convertor lock-up clutch, is typically configured to frictionally or mechanically couple the impeller and the turbine to rotate as an integral unit, which eliminates variable hydraulic slip energy loss and establishes more efficient power transfer across TC 155. The TC bypass clutch 157 may also be replaced with and/or engaged to operate as a launch clutch for smooth vehicle launch. Alternatively, or in combination, TC bypass clutch 157 may be configured as a launch clutch similar to disconnect clutch 125 and may be positioned between M/G 120 and transmission 160, for applications that do not include or require TC 155 or bypass clutch 157. In some applications, disconnect clutch 125 is generally referred to as an upstream clutch and TC bypass clutch 157 is generally referred to as a downstream clutch. Disconnect clutch 125 and TC bypass clutch 157 can be modulated over a range between the engaged and disengaged positions, which enables a variable torque multiplier ratio. This enables a variable mechanical slip in TC 155, in addition to the variable slip produced by the hydrodynamic coupling between the impeller and the turbine.

Transmission or gearbox 160 may include gear sets (not shown) or a plurality of manually and/or automatically selectable gears that are selectively placed in different gear ratios by manually or automatically actuated hydraulic or electromechanical engagement of friction elements such as clutches and brakes, and other elements, to establish the desired multiple, discrete, or step drive and torque multiplier ratios. The friction elements are controllable through a shift schedule implemented by one or more controllers that connects and disconnects certain elements of the gear sets to control the torque multiplier ratio between output transmission drive shaft 150 and input torque convertor drive shaft 145. Transmission 160 is manually and/or automatically shifted by the controllers from one torque multiplier ratio to another based on various vehicle operating conditions, as described elsewhere herein. Transmission 160 then transmits powertrain output torque to output drive shaft 150.

Transmission 160 is but one example of a transmission or gearbox arrangement, and any comparable component that converts and transmits input torque(s) from engine 115 and M/G 120 to output drive shaft 150 at such different torque multiplier ratios, is contemplated for use with the embodiments described herein. For example, transmission 160 may be implemented by an automated mechanical (or manual) transmission that includes servo motors to translate and rotate shift forks along a shift rail to select a desired gear ratio, which can be configured for operation with a range of vehicle torque requirements.

In other variations, a transmission oil pump 165 is included and is coupled to M/G 120 to produce hydraulic oil pressure for any number of components, which can include, for example, release or disconnect clutch 125, torque converter 155, bypass clutch 157, and transmission 160, when engine 115 is decoupled and/or powered down. An electric auxiliary transmission oil pump 170 may also be included for use alone or in combination with other components, and to also supplement and/or generate hydraulic pressure when both engine 115 and M/G 120 are unpowered, or otherwise unable to produce hydraulic pressure.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for M/G 120, and other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, M/G 120, and vehicle 100, as depicted in FIG. 1, through various mechanical and electrical interfaces and vehicle controllers, as described elsewhere herein. High voltage M/G battery 175 is also coupled to M/G 120 by one or more of a motor control module (MCM), a battery control module (BCM), and/or power electronics 185, which are configured to condition direct current (DC) power provided by high voltage (HV) battery 175 for M/G 120. MCM/BCM 185 is also configured to condition, invert, and transform DC battery power into three phase alternating current (AC) as is typically required to power electric machine or M/G 120. MCM/BCM 185 is also configured to charge one or more batteries 175, 180 with energy generated by M/G 120 and/or FEAD components, and to supply power to other vehicle components as needed.

Vehicle 100 may also incorporate one or more brakes 190 coupled to wheels 154 and brake system control module (BSCM) 195. Brakes 190 and BSCM 195 may be operative to mechanically and/or electrically decelerate wheels 154, and to enable regenerative braking that captures deceleration energy from wheels 154, and in cooperation with MCM/BCM 185, and possibly other controllers, M/G 120, and other components, enables charging of HV battery(ies) 175 and other batteries 180, and other power storage components.

With continued reference to FIG. 1, vehicle 100 further includes one or more controllers and computing modules and systems that enable a variety of vehicle capabilities. For example, vehicle 100 may incorporate a vehicle system controller (VSC) 200 and a vehicle computing system (VCS) and controller 205, which are in communication with MCM/BCM 185, BSCM 195, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

While illustrated here for purposes of example, as discrete, individual controllers, MCM/BCM 185, BSCM 195, VSC 200 and VCS 205 may control, be controlled by, communicate signals to and from, and communicate with other controllers, and other sensors, actuators, signals, and components that are part of the larger vehicle and control systems and internal and external networks. The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip (SoCs) may be used to precondition and preprocess particular signals during communications, and before and after such are communicated.

In further illustrations, MCM/BCM 185, BSCM 195, VSC 200, VCS 205, CAN 210, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data.

With attention invited again to FIG. 1, vehicle 100 also may include VCS 205 to be the SYNC onboard vehicle computing system manufactured by the Ford Motor Company (See, for example, U.S. Pat. No. 9,080,668). Vehicle 100 also may include a powertrain control unit/module (PCU/PCM) 215 coupled to VSC 200 or another controller, and coupled to CAN 210 and engine 115, M/G 120, and TC 155 to control each powertrain component. A transmission control unit (TCU) 220 is also coupled to VSC 200 and other controllers via CAN 210, and is coupled to transmission 160 and also optionally to TC 155, to enable operational control. An engine control module (ECM) or unit (ECU) or energy management system (EMS) 225 may also be included to be in communication with CAN 210, and is coupled to engine 115 and VSC 200 in cooperation with PCU 215 and TCU 220 and other controllers.

In this arrangement, VSC 200 and VCS 205 cooperatively manage and control the vehicle components and other controllers, sensors, and actuators. For example, the controllers may communicate control commands, logic, and instructions and code, data, information, and signals to and/or from engine 115, disconnect clutch 125, M/G 120, TC 155, transmission 160, batteries 175, 180, and MCM 185, and other components and systems. The controllers also may control and communicate with other vehicle components known to those skilled in the art, even though not shown in the figures. The embodiments of vehicle 100 in FIG. 1 also depict exemplary sensors and actuators in communication with vehicle network and CAN 210 that can transmit and receive signals to and from VSC 200, VCS 205, and other controllers.

For example, vehicle 100 may include an accelerator position and motion sensor (APP) 230, a brake pedal position and motion sensor (BPP) 235, and other driver controls and vehicle profile and performance parameters (VPP) 240, which may include steering wheel position and motion sensors, driver turn signal position sensors, driver selectable vehicle performance preference profiles and parameters, and driver selectable vehicle operational mode sensors and related profile parameters and settings. Such profile parameters and settings may include profile parameters, which may be driver selectable and which may establish various preferred and/or predetermined vehicle performance characteristics and driver profile preferences, as described elsewhere herein. Further, vehicle 100 may have VCS 205 configured with one or more communications, navigation, and other sensors, as described elsewhere herein with respect to the Ford Motor Company SYNC system, and other similar systems. VCS 205 can cooperate with VSC 200 and other controllers to manage and control vehicle 100 in response to sensor and communication signals identified, established by, and received from these vehicle systems and components.

For further example, various other vehicle functions, actuators, and components may be controlled by the controllers within the vehicle systems and components, and may receive signals from other controllers, sensors, and actuators, which may include, for purposes of illustration but not limitation, fuel injection timing and rate and duration, throttle valve position, spark plug ignition timing (for spark-ignition engines), intake/exhaust valve timing and duration, front-end accessory drive (FEAD) components such as an air conditioning compressor, a transmission oil pump, an alternator or generator, M/G 120, high and low voltage batteries 175, 180, and various sensors for regenerative braking, battery charging or discharging (including sensors for determining the maximum charge, state of charge, and discharge power limits), temperature, voltage, current, state of charge (SOC), maximum charge, and discharge power limits, clutch pressures for disconnect clutch 125, bypass/launch clutch 157, TC 155, transmission 160, and other components. Sensors communicating with the controllers and CAN 210 may, for further example, establish or indicate turbocharger boost pressure, crankshaft position or profile ignition pickup (PIP) signal, engine rotational speed or revolutions per minute (RPM), wheel speeds (WS1, WS2, etc.), vehicle speed sensing (VSS), engine coolant temperature (ECT), intake manifold air pressure (MAP), accelerator pedal position sensing (PPS) or APP 230, brake pedal positon sensing (BPS) or BPP 235, ignition switch position (IGN), throttle valve position (TP), air temperature (TMP), barometric pressure, exhaust gas oxygen (EGO) or other exhaust gas component concentration or presence, intake mass air flow (MAF), transmission gear, ratio, or mode, transmission oil temperature (TOT), transmission turbine speed (TS), torque convertor bypass clutch 157 status (TCC), and deceleration or shift mode (MDE), among others.

Figure 2:
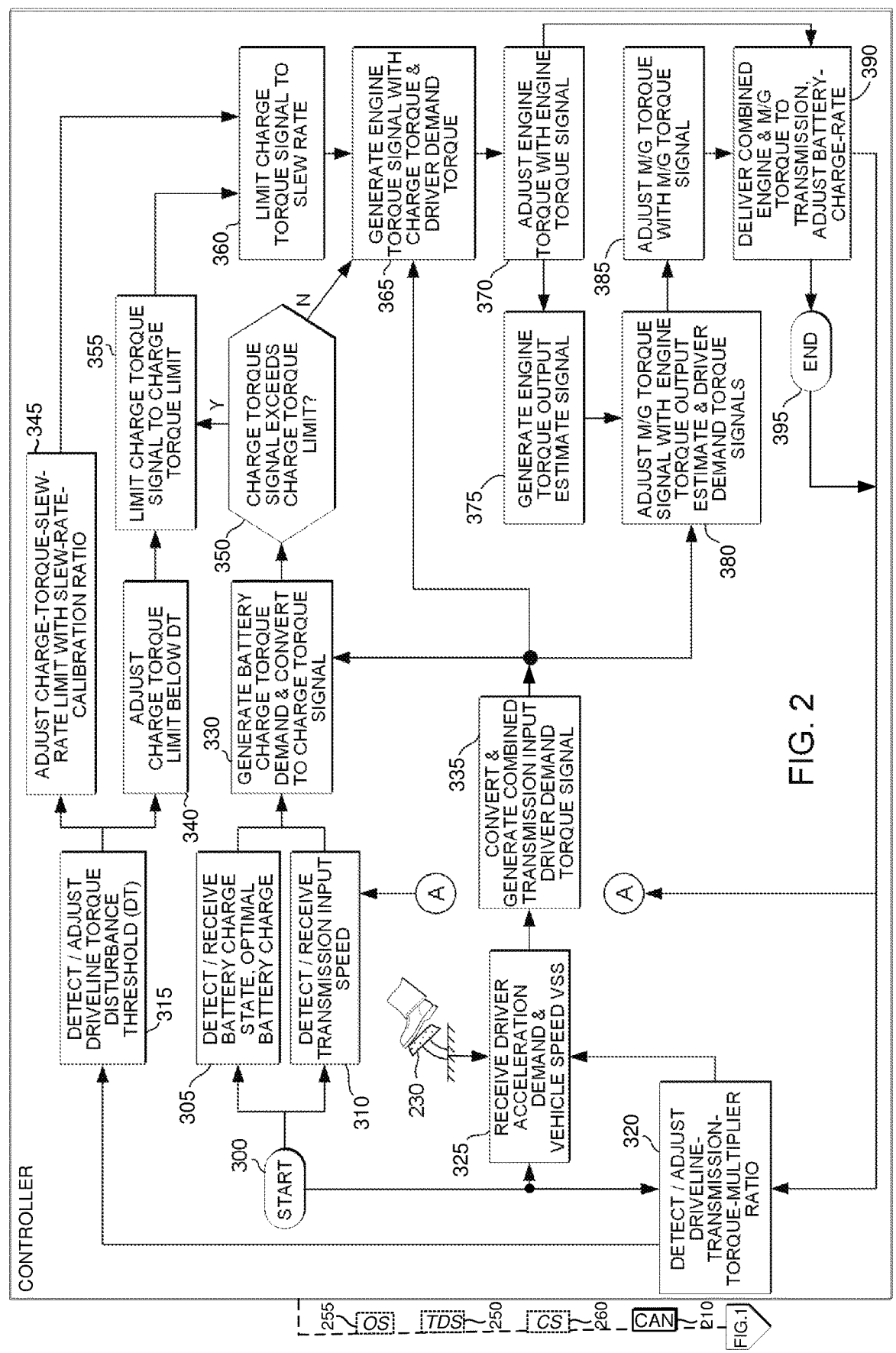
FIG. 2 illustrates additional aspects and capabilities of the vehicle and systems and methods of FIG. 1, with certain components and features added, removed, modified, and rearranged.

As depicted in the various figures, including FIGS. 1 and 2, and others, such control logic and executable instructions and signals, and data can also include vehicle torque demand signals (TDS) 250, other signals (OS) 255, and control or command signals (CS) 260 received from and sent to vehicle controllers, components, and systems. Such signals and commands may be from any of the vehicle controllers, sensors, actuators, components, and systems signals. Any or all of these signals can be raw analog or digital signals or preconditioned, preprocessed, combination, and/or derivative signals generated in response to other signals, and embedding information therein. TDSs 250 and OSs 255 may include a variety of specific signals, including for purposes of illustration without limitation, battery charge state, transmission input speed, charge-torque, and various limit signals, as well as digital data and information embedded in such signals, and as described in more detail elsewhere herein.

The communication and operation of the described signals 250, 255, commands 260, control instructions and logic, and data and information by the various contemplated controllers, sensors, actuators, and other vehicle components, may be represented schematically as shown in FIG. 1, and by flow charts or similar diagrams as exemplified in FIG. 2, and elsewhere herein. Such flow charts and diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof. The steps and functions shown may be executed, communicated, and performed in the sequence depicted, and in parallel, in repetition, in modified sequences, and in some cases may be combined with other processes and omitted. The commands, control logic, and instructions may be executed in one or more of the described microprocessor-based controllers and may be embodied as primarily hardware, software, virtualized hardware, firmware, virtualized firmware, and combinations thereof.

During operation of vehicle 100, and with continued reference to FIG. 1 and now also to FIG. 2, vehicle 100 incorporates a controller, such as one or more of VSC 200, VCS 205, PCU 215, and others, which controller(s) is/are configured to initiate signals 250, 255, control logic, CS 260, and instructions 300 (FIG. 2), to detect or receive at step 305, a battery state of charge or charge state 305 and an optimal battery charge 305. Also received or detected is a transmission input speed 310, and a current driveline 105 torque disturbance threshold (DT) 315. Monitoring concurrently or in parallel, the controllers also detect or receive a driveline and/or transmission/torque convertor torque-multiplier ratio 320, and a vehicle speed (VSS, WS1, WS2, etc.) and driver acceleration demand 325.

The optimal battery charge 305, may be included as a parameter of VPPs 240 that is predetermined for vehicle 100, and includes a battery maximum preferred or optimal state of charge 305 that is used with the battery charge state 305 to determine how much power may be required to recharge one or more batteries 175, 180, up to the maximum optimal state of charge 305. The transmission input speed 310 communicates the current speed of the transmission 160 at an input side, which is used in various determinations and control logic steps described elsewhere herein.

The current or instantaneous driveline DT 315 describes a maximum torque disturbance that is preferred for given operating condition of a particular make and model of vehicle 100 and a driver preference. Such a DT 315 or range of DTs 315 and/or driver preferences may also be parameters included in the predetermined and/or adjustable driver preferences VPPs 240. In these arrangements, the controller(s) may also be configured to receive charge state 305 from one or more of batteries 175, 180; and to adjust battery charge demand 330 with and using charge state 305 and optimal charge state 305 (for example, one or more of VPPs 240). Then, the controller(s) convert charge demand 330 to charge torque or charge torque signal 330 so that it is constrained by and/or less than or equal to approximately charge-torque limit 340.

A torque ratio is a dimensionless magnitude that describes the relationship between an output torque and an input torque across powertrain 110 components that are configured to multiply or reduce torque being transmitted through and by the component. TC 155 and transmission 160 are torque multiplier/reducer components. For example, at slow speeds, TC 155 with bypass clutch 157 open or unlocked is a torque multiplier, and as TC 155 increases its speed, its respective torque ratio decreases, and as it reaches a maximum speed and bypass clutch 157 is engaged or locked, its torque ratio becomes constant at some predetermined engineering design ratio established for a particular vehicle or HEV 100, which for example may be approximately 1.0, or less.

Transmission 160 cycles through a range of gears from low gear and high-torque multiplier ratios, on the order of approximately as much as 10 or more, to higher gears and lower torque ratios, where lower torque ratios may be as low as about 0.65 or lower. During operation of both TC 155 and transmission 160 through their operating ranges, vehicle occupants may feel the changing torque ratios and changing gears as nominal perturbations in vehicle acceleration and speed. Such perturbations may be substantial and possibly undesirable, especially if amplified during operation with higher torque multiplier rations. For all such components, a high torque ratio across powertrain 110 components may result in an amplified beyond nominal perturbations and become torque disturbances perceived by vehicle occupants. Conversely, lower torque ratios related to higher gears in transmission 160 and higher speeds of TC 155 result in reduced apparent perceptions of such perturbations and torque disturbances.

A torque disturbance generally describes an unwanted disturbance that is felt by a driver and passengers in a vehicle when powertrain 110 components increase and decrease their speed. For example, when vehicle powertrain 110 increases its speed as vehicle 100 launches from a rest position, or increases its current speed, and begins to accelerate, vehicle occupants may feel a forward acceleration and be pressed against their seats. When the vehicle powertrain 110 slows down, and during braking, the occupants may feel a forward deceleration and are pressed against their seating restraints or seat belts. During both acceleration and deceleration, the occupants may feel pronounced "chugging" perturbations, impulses, and/or vibrations in acceleration and deceleration while powertrain 110 accelerates and decelerates, and as other powertrain 110 or driveline 105 components, such as TC 155 or transmission 160, cycle through their respective operating ranges. These torque disturbances may detract from driver and occupant preferred feel and performance of the vehicle.

Occupants of sport vehicles may prefer to feel each and every such change and perturbation as tactile feedback of preferred perceptions of "sporty" or "power" vehicle performance characteristics. In contrast, occupants of passenger sedans may prefer to not feel any such perturbations, and may prefer smooth, gentle acceleration and deceleration during vehicle operation. In both sport and sedan vehicle configurations, DT 315 may be configured to accommodate any range of preferred perturbations and torque disturbances.

For example, a sport coupe or sport utility vehicle 100 may have a DT 315 may preferably be configured to enable more noticeable acceleration, deceleration, and fluctuations thereto (higher, more noticeable torque disturbances). Such preferred DTs 315 may be configured for certain enhanced performance operating conditions of vehicle 100, and for predetermined, and possibly selectable "high-performance response" driver preference profiles (VPPs 240). Such a sport or utility DT 315 may be relatively higher than a comparatively lower DT 315 that is preferred for a passenger sedan. Such a passenger sedan variant of vehicle 100 may be configured for a "smooth-performance response" driver preference profile (VPP 240), which configures the vehicle for a comfortable and gentle or smooth ride, wherein a gentler acceleration and deceleration, and fluctuations thereto are preferred (lower, less noticeable torque disturbances), and which are also possibly selectable by a driver as adjustable VPPs 240. In all such configurations, DT 315 may also be adjusted in real-time during operations to be increased and decreased as vehicle components, such as TC 155, transmission 160, and other components, cycle through their respective ranges of operation, and possibly introduce otherwise unwanted or undesirable torque disturbances.

In further examples, DT 315 may be automatically adjusted by the controllers to limit the amount of any torque disturbance so as to limit wear and tear on vehicle components over the life time of vehicle operation, in addition to accommodating driver selectable preferences (VPPs 240) and predetermined vehicle performance response (that also may be stored as VPPs 240). In addition to these considerations, such torque disturbances may also be experienced in HEVs 100 that include transmissions and hybrid powertrains 110 incorporating ICEs 115 operating in combination with M/Gs 120. For example, HEVs 100 encounter two primary demands, among others, for power and torque from ICE 115, which include battery charge demand 305 and driver acceleration demand 325. Such demands 305, 325 may introduce further torque disturbances beyond preferred performance characteristics, due to differing performance capabilities, and varied phase and magnitude anomalies and response times of ICE 115, M/G 120, various controllers and CAN 120, and other components.

The battery charge demand 305 may require ICE 115 to increase speed to enable M/G 120 to charge batteries 175, 180, while driver acceleration demand 325 may concurrently and independently require both ICE 115 and M/G 120 to respond with increased torque to propel HEV 100. A combined torque demand from both battery charge demand 305 and driver acceleration demand 325 may be large enough in magnitude and required rate of increase to introduce further non-preferred torque disturbances.

For example, consider a battery charge demand 330 that requires M/G 120 to produce a negative torque having a large magnitude and at a rapid rate of change or a slew rate for battery charging power. The rapid rate of change or slew rate describes how quickly the rotational speed, torque output, and power generated by M/G 120 changes in response to battery charge demand 330. Also consider that this may occur at the same time when engine 115 is required to produce a large positive torque at a high rate of change or slew rate to power both M/G 120 and to meet driver acceleration demand 325. Further, vehicle performance anomalies may arise from environmental changes due to barometric pressure, altitude, humidity, and temperature, as well as vehicle component performance issues, which alone and together may introduce added control logic inconsistencies or noise in vehicle control systems. These, in turn, may cause added or subsequent torque disturbances due to resultant changes in performance of ICE 115 and M/G 120, and related vehicle components and systems. These circumstances can result in a divergence of positive and negative torque magnitudes and slew rates for ICE 115 and M/G 120. Such circumstances may introduce such new and unwanted torque disturbances in driveline 105 and powertrain 110 in addition to those already described, which new torque disturbances can be amplified during times of high torque multiplier ratios into possibly undesirable perturbations perceived by vehicle occupants.

Consequently, the embodiments of HEV 100 described in this disclosure are configured to adjust and control DT 315 and other parameters in view of such new driveline 105 and powertrain 110 torque disturbances to achieve preferred and predictable driver and vehicle response characteristics. With continuing reference to FIGS. 1 and 2, the controller(s), is/are configured to establish or generate a battery charge demand and a charge-torque signal 330, using the received or detected battery charge state and optimal battery charge 305, and transmission input speed 310. The transmission input speed 310 can establish the magnitude of the torque being transmitted to drive shafts 130, 140, 145, and 150 (FIG. 1), which speed 310 may be used to determine how to change torque of M/G 120 to meet battery charge demand 330.

A combined transmission input, driver demand torque signal 335 is generated from a conversion of transmission input speed 310, torque-multiplier ratio 320, and driver acceleration demand and vehicle speed 325 (VSS, WS1, WS2, etc.). In response to charge-torque signal 330, vehicle or HEV 100 controllers, such as one or more of VSC 200, PCU/PCM 215 and others, adjust a charge-torque limit 340 and a slew-rate limit 345, respectively with DT 315 and a slew-rate-calibration ratio (also 345, FIG. 2). The charge-torque limit 340, in consideration of current driveline torque-multiplier ratio 320 and DT 315, among other parameters, is adjusted with DT 315 to lessen any possible torque disturbance that may otherwise arise from delivering the maximum possible battery charge torque 330 and driver demand torque 335.

In additional variations of these embodiments, transmission-torque-multiplier ratio 320 may also be further adjusted from a speed of TC 155, an engagement position of bypass clutch 157, and a selected gear of the plurality of gears of transmission 160. It may be further preferable to optionally configure the controller(s) to increase DT 315 when one or more of: (a) bypass clutch 157 is engaged, (b) TC 155 operates at a torque ratio of, for example, less than or equal to approximately 1.2, and (c) transmission-torque-multiplier ratio 320 is less than or equal to approximately 1.5, for example. In this configuration, the controller(s) may also simultaneously increase charge-torque and slew-rate limits 340, 345 as DT 315 increases. In additional configurations, the controller(s) adjust slew-rate-calibration ratio 345 with a transmission-torque-multiplier ratio 320 and DT 315.

Charge-torque-slew-rate limit 345 is adjusted according to DT 315 and slew-rate-calibration ratio 345 to mitigate potentially undesired torque disturbances from delivering charge and driver demand torque 330, 335 too quickly and while torque-multiplier ratio 320 is high enough to amplify torque disturbances to be undesirably perceived by vehicle occupants. Further, the controller(s) may adjust the charge-torque limit 340 with DT 315 and transmission-torque-multiplier ratio 320. Both charge-torque limit 340 and slew-rate limit 345 may be continually adjusted in real-time in response to changing DT 315 and torque-multiplier ratio 320 to eventually meet the full combined charge and drive demand torque (combined to generate engine torque signal 365). Concurrently, combination engine torque signal 365 is also constrained by and/or limited to be less than or equal to approximately charge-torque limit 340, and which thereby avoids introduction of unwanted torque disturbances that exceed DT 315, and interrelated charge-torque limit 340 and slew-rate limit 345.

Further, in response to driver demand torque and torque signal 335, and if charge-torque and torque signal 330 exceeds charge-torque limit 340 (at step 350, FIG. 2), then battery charge torque 330 is limited at step 355 to be constrained by and/or less than or equal to and/or approximately charge-torque limit 340, and the rate of change of battery charge torque 330 is limited at step 360 to be constrained by and/or less than or equal to and/or approximately charge-torque-slew-rate limit 345. With charge-torque limit 340 and charge-torque-slew-rate limit 345 applied, the controller(s) then generate an engine torque signal 365 from combined battery charge torque 330 and driver demand torque 335. At step 370 of FIG. 2, engine 115 output torque is commanded with CS 260 and adjusted using engine torque signal 365. This controls any possible transmission torque output disturbance to thereby be less than or equal to DT 315, even when amplified by the current torque multiplier ratio of driveline 105.

Once engine 115 is commanded by and adjusted with engine torque signal 365, the controller(s) generate an engine torque output estimate signal 375 using a number of parameters as previously described, which for example may include one or more of engine RPM speed, air intake MAP, MAF, and fuel consumption TP, and other vehicle performance parameters. Alternatively, an engine torque output sensor may generate torque output estimate signal 375, and may be incorporated as an accelerometer about one or more drive shafts, 130, 140, within M/G 120, or disconnect clutch 125, and/or M/G 120 may be modified to sense and estimate input torque from ICE 115. The controllers generate and/or adjust an M/G torque signal 380 using engine-torque-output-estimate signal 375 and reduced by, subtracting, or minus driver demand torque 335. This thereby establishes and generates M/G torque signal 380 to also be limited by charge-torque limit 340, to change at charge-torque-slew-rate limit 345, and consequently to ensure any M/G-related torque disturbance remains below DT 315, which minimizes unwanted torque disturbances detected by vehicle occupants.

This also controls and/or adjusts any possible transmission 160 torque output disturbance to also thereby be less than or equal to approximately DT 315. M/G 120 is then adjusted at step 385 with M/G torque signal 380, and the combined engine and M/G output torques are delivered at step 390 to transmission 160, completing at step 395 one repetitive cycle of the initiated control logic, command signals (CS) 260, and instructions 300, after which, controllers repetitively start again at step 300.

In another exemplary configuration, the controller(s) may adjust DT 315 with transmission input speed 310, as well as transmission-torque-multiplier ratio 320 that is further adjusted by transmission input speed 310 and a selected gear of the plurality of gears of transmission 160. Further variations can include the controller(s) configured to continuously and/or intermittently adjust and increase DT 315 as transmission-torque-multiplier ratio 320 decreases as higher gears are selected in the plurality of transmission gears. As DT 315 is increased by the controller(s) in response to such lower torque ratios, the controller(s) may further then increase charge-torque limit 340 and charge-torque-slew-rate limit 345, because any possible torque disturbance will be less noticeable to vehicle occupants during vehicle operation with lower driveline and transmission-torque-multiplier ratios 320.

Conversely, the controller(s) may be further configured to continuously and/or intermittently adjust and decrease DT 315 as transmission-torque-multiplier ratio 320 increases as lower gears are selected in the plurality of transmission gears. As DT 315 is decreased by the controller(s) due to such higher torque ratios, the controller(s) may also decrease charge-torque limit 340 and charge-torque-slew-rate limit 345, which lessens the likelihood that possible and unwanted torque disturbances will noticeable to vehicle occupants during vehicle operation with higher driveline and transmission-torque-multiplier ratios 320.

Each of the various embodiments of the disclosure and the many alternatives also include methods of operation that include one or more of the noted controllers responding to commands from other controllers, and receiving and transmitting commands CS 260 to other controllers, vehicle systems, and components. For example, with continuing reference to the various figures and including FIG. 1 and FIG. 2, a method for controlling a vehicle may include one or more controller(s) responding to and/or receiving charge and driver demand torque signals, 330, 335, and adjusting engine torque 370 at charge-torque-slew-rate limit 345, to approximately the combined driver demand torque and charge torque 365 (engine torque signal), which is constrained by and/or does not exceed charge-torque limit 340.

Further, the controller(s) of the method of operation is/are commanding charge-torque and charge-torque-slew-rate limits 340, 345 to increase as DT 315 increases in response to the controllers commanding decreases to transmission-torque ratio 320. As with other arrangements, the method of operation may also include controller(s) commanding and communicating CSs 260, for adjusting, and decreasing charge-torque and charge-torque-slew-rate limits 340, 345 as DT 315 is also decreased in response to transmission-torque-multiplier ratio 320 increasing. The controller(s) are also configured for commanding increases in, and/or communicating commands 260 that increase charge-torque limits and slew-rate 340, 345 when DT 315 is increased as transmission-torque-multiplier ratio 320 decreases. The controller(s) also are modified for commanding a decrease of charge-torque and slew-rate limits 340, 345 in response to DT 315 decreasing when transmission-torque-multiplier ratio 320 is increasing.

In variations of these methods of operation, the controller(s) also may be further configured for responding to driver demand torque 335 and charge-torque signal 330, and generating or commanding other controllers for generating: (a) engine torque signal 365 that combines driver demand torque 335 and charge torque 330, (b) an engine torque-output-estimate signal 375 from engine speed VSS, air intake MAF, and fuel consumption TP, and (c) an electric machine torque signal 380 equal to engine torque-output-estimate signal 375 less or minus or reduced by driver demand torque 335. These controllers are also then adapted for commanding engine 115 and electric machine or M/G 120 respectively with engine torque signal 365 and M/G or electric machine torque signal 380. Other arrangements of the methods of operation further include the controller(s) enabled for adjusting DT 315 with the transmission input speed 310 and further adjusting transmission-torque-multiplier ratio 320 with transmission input speed 310 and a selected gear of the plurality of gears of transmission 160.

With continued reference to the preceding figures, and now also with reference to FIGS. 3, 4, 5, 6, 7, and 8, various implementations of the disclosure illustrate further examples of performance of HEV 100 and its controllers, systems, and components, and related methods of operation. A predetermined or preferred performance of HEV 100, may be selected for the aforementioned operational conditions of positive and negative torque divergence between ICE 115 and M/G 120 during operation. Further, for purposes of example and illustration but not limitation, it may be preferred that a resultant torque disturbance, which may be perceived by vehicle occupants, be limited to approximately 20 Newton-meters (Nm) at output drive shaft 150 and/or wheels 154.

Figure 3:
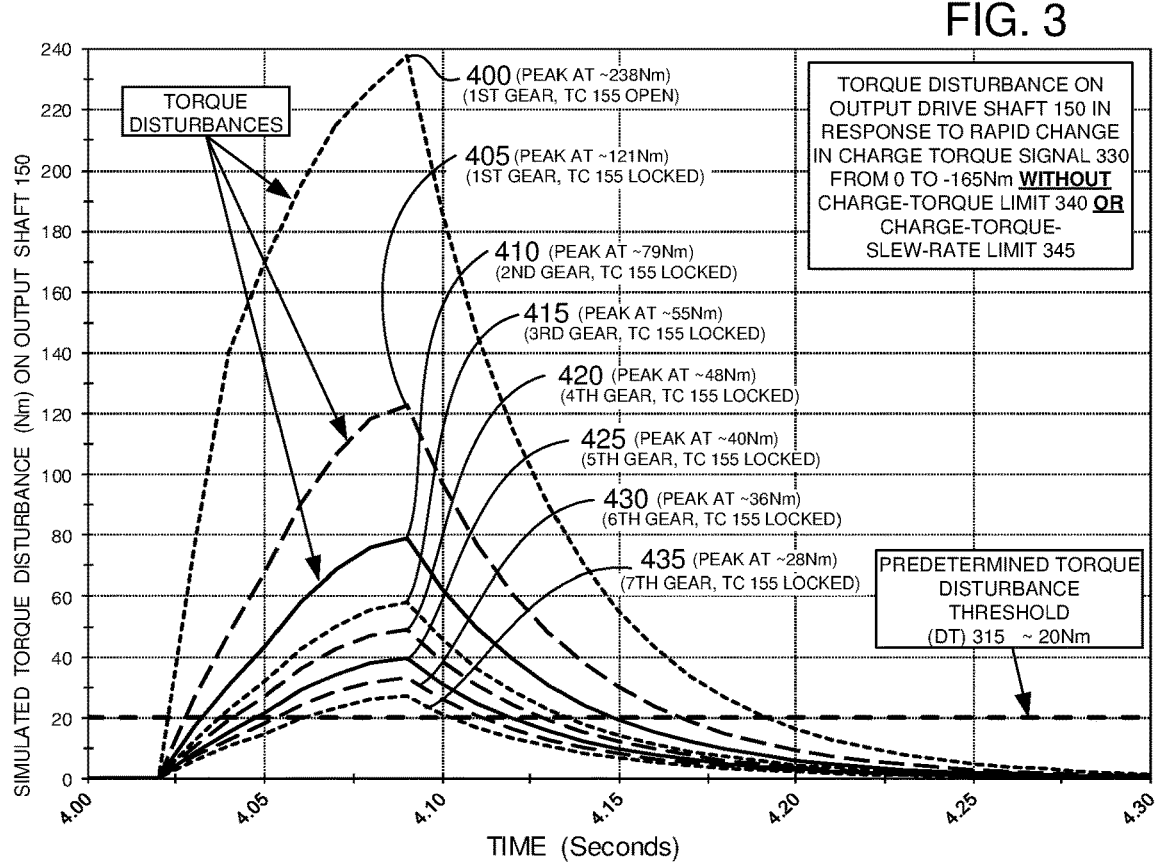
FIG. 3 depicts various simulated torque disturbance and related performance aspects of the vehicle systems and methods of FIGS. 1 and 2.

With reference specifically also now to FIG. 3, HEV 100 performance is demonstrated in a simulation without implementation of charge-torque limit 340 and charge-torque-slew-rate limit 345. FIG. 3 illustrates, among other aspects, a simulated test data set for operation of HEV 100 that reflects resulting torque disturbances in Newton-meters (Nm) detected on or about transmission output shaft 150 and/or wheels 154, over a time span of less than about a few hundred milliseconds. The torque disturbances are detected during operation of ICE 115, M/G 120, and transmission 160 as it cycles through a range of gears of the plurality. A preferred or predetermined DT 315 is selected to be about 20 Nm, which reflects a possibly preferred and example or baseline DT 315. Possible torque disturbances below this 20 Nm DT 315 are believed less likely to be perceived by or cause annoyance or discomfort to vehicle occupants. The initial, simulated torque disturbances 400, 405, 410, 415, 420, 425, 430, and 435 of FIG. 3 are detected at about 4.02 s into the simulation test, and persist until about 300 milliseconds until about 4.30 s. For reference purposes, the pre-selected constant DT 315 of about 20 Nm is depicted as a constant over the time span.

During simulated operation and at about 4.02 seconds into the test, HEV 100 is simultaneously subjected to simulated driver acceleration demand 325 during a low battery charge state 305 below optimal battery charge 305. The simulated low battery charge state 305 is triggered to generate battery charge demand and charge-torque signal 330 of as much as about negative 165 Nm (−165 Nm). Additionally, driver acceleration demand 305 is adjusted to generate driver demand torque signal 335 to be about a constant 35 Nm.

The low battery charge state 305 and driver acceleration demand 305 are combined without limits 340, 345, and cause HEV 100 and its systems and components to generate combination engine torque signal 365 of about 200 Nm (a combination of 35 Nm and 165 Nm), as well as engine torque output estimate signal 375 and M/G torque signal 380. This causes the controller(s) to rapidly slew engine 115 to a higher RPM of about 190 Nm to about 200 Nm (see also, FIGS. 7 and 8, as discussed in more detail below) to meet acceleration demand 325 and battery charge demand 305, which is the torque output needed from ICE 115 to generate the driver demand of about 35 Nm to transmission input shaft 145. In response to M/G torque signal 380, M/G 120 is also rapidly slewed or adjusted to the negative torque output of about −165 Nm to charge one or more batteries 175, 180 at the same time ICE 115 is accelerating to the higher RPM. Neither charge-torque limit 340 nor charge-torque-slew-rate limit 345 are applied, which results in a substantial positive and negative torque divergence of about 355 Nm (190 Nm minus−165 Nm) between ICE 115 and M/G 120.

HEV 100 accelerates in this simulation as engine 115 and M/G 120 are commanded according to the preceding descriptions. TC 155, bypass clutch 157, and transmission 160 are adjusted through their respective ranges of operation. FIG. 3 reflects the simulated resultant torque disturbances at output shaft 150 and/or wheels 154, for each of the TC 155 and transmission 160 gears and configurations. During initial acceleration of HEV 100, a first torque disturbance (TD) 400, due to the divergent positive and negative torque and differing slew rates of ICE 115 and M/G 120, is amplified through driveline 105 and reaches about 238 Nm as detected at output drive shaft 150 and wheels 154. TD 400 arises while transmission 160 is in a first gear of the plurality of selected gears and TC 155 functions essentially as a launch clutch, with bypass clutch 157 unlocked to generate a torque-multiplier ratio 320 of about 10-to-1.

Those skilled in the art should appreciate with respect to the preceding descriptions that transmission-torque-multiplier ratio 320 is relatively higher at this stage of operation in $1^{st}$ gear with TC 155 having bypass clutch 157 open and unlocked, than when higher gears of transmission 160 are selected. As a result, torque disturbances 400 to 435 as illustrated for lower gears in FIG. 3 and the related figures generate detected torque disturbances that all exceed the preferred DT 315 of about 20 Nm. Continuing the simulated acceleration, TC 155 locks bypass clutch 157 at the higher range of operation of the first gear of transmission 160, and another TD 405 of about 121 Nm arises, which is lower than TD 400, but which still surpasses DT 315 of 20 Nm. As acceleration continues and HEV 100 increases its speed, bypass clutch 157 remains locked and transmission 160 selects higher gears of the plurality, and torque-multiplier ratio 320 decreases.

In a second gear of transmission 160, a simulated TD 410 of about 79 Nm propagates through driveline 105. In a third gear, a TD 415 is simulated to be about 55 Nm is perceived. Fourth gear predicts a TD 420 of about 48 Nm, fifth gear experiences a TD 425 of about 40 Nm, sixth gear sees a TD 430 of about 36 Nm, while seventh gear has a TD 435 of around 28 Nm. Across the range of torque-multiplier ratios 320 of TC 155 and transmission 160, HEV 100 experiences higher than preferred TDs that are detected at wheels 154 and transmission output drive shaft 150. Even though TDs 400 through 435 occur over a time span of about 300 milliseconds (4.02 s to 4.30 s), vehicle occupants may perceive multiple jolts or vibrations in driveline 105, which may be undesirable.

Figure 4:
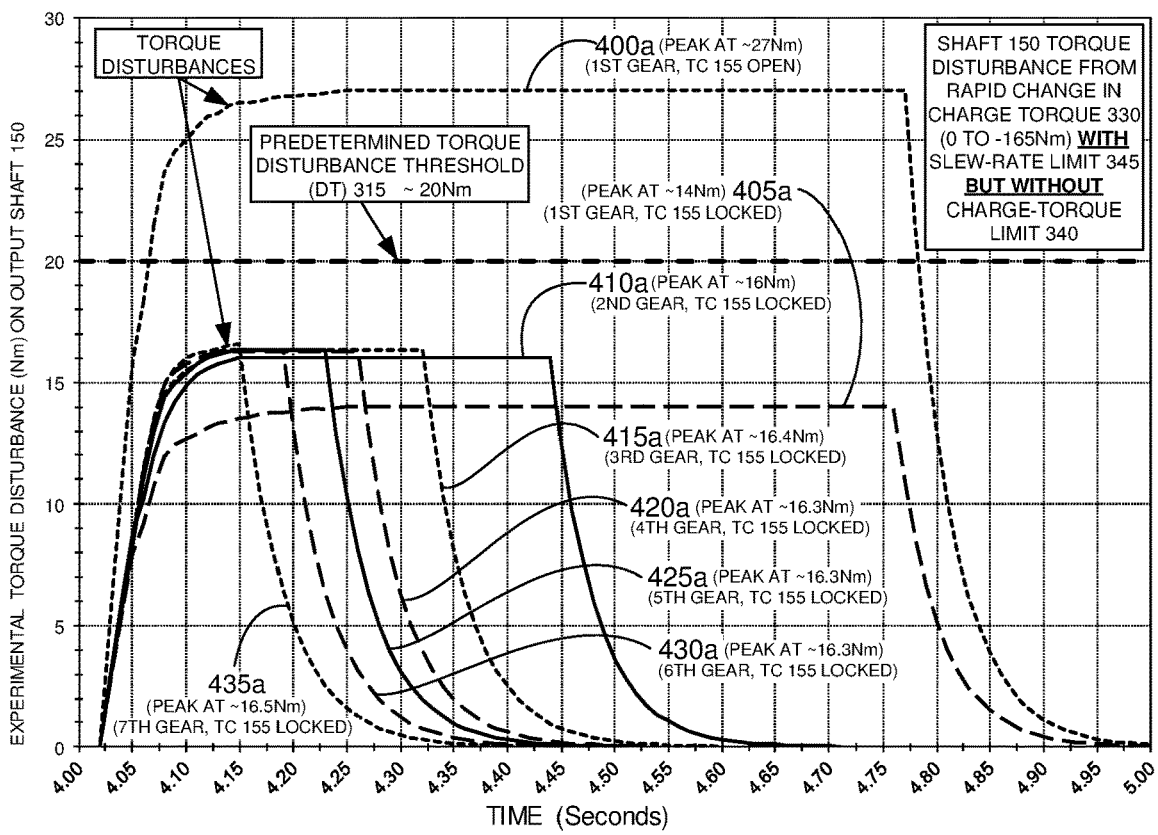
FIG. 4 illustrates experimental torque disturbance and related performance capabilities of the vehicle and systems of the preceding figures.
Figure 6:
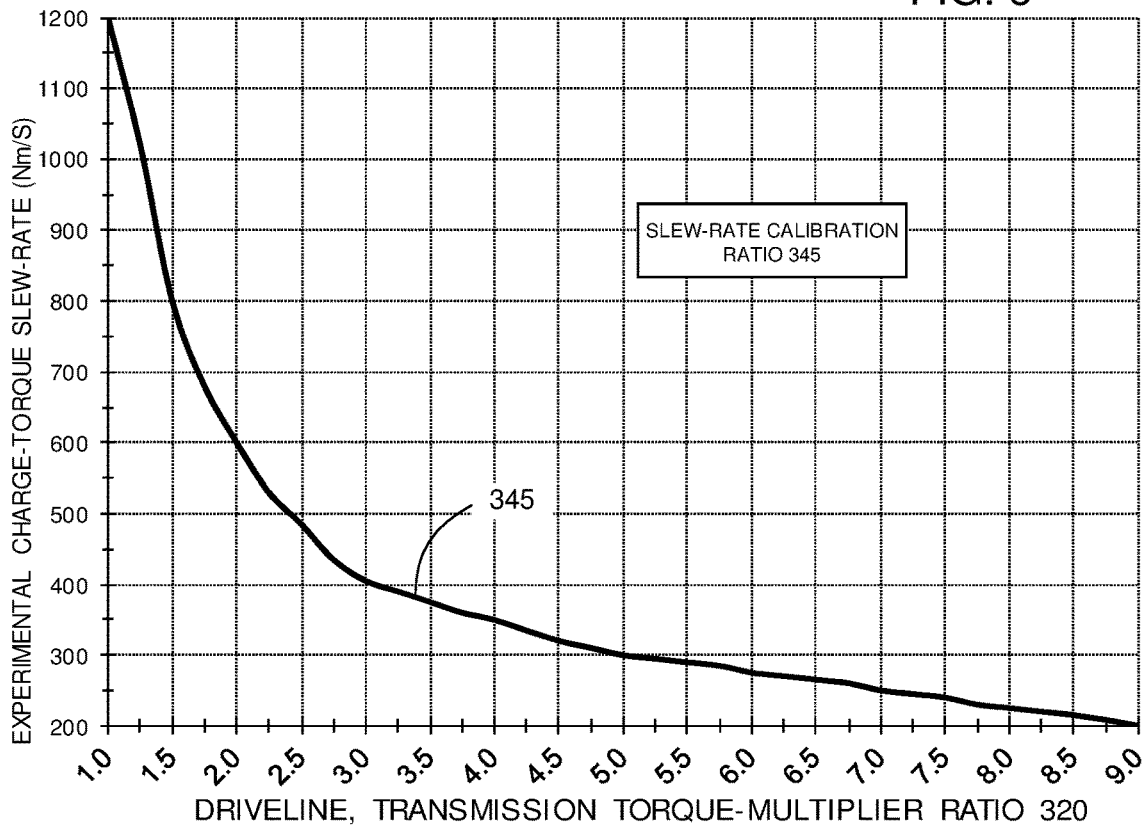
FIG. 6 shows an additional illustration of a charge-torque-slew-rate and driveline, transmission-torque-multiplier ratio calibration of the vehicle and systems of the disclosure and prior figures.

With continuing attention to the preceding figures and now also turning specifically to FIG. 4, the experimental performance of HEV 100 is further investigated, but with implementation of charge-torque-slew-rate-limit 345 being applied during acceleration under similar operating conditions to those previously described. For purposes of illustration and this next experiment, the response time of engine 115 and M/G 120 are adjusted with charge-torque-slew-rate limit 345 using slew-rate-calibration ratio (FIG. 6, discussed in more detail below). In this experiment, the predetermined, preferred DT 315 is adjusted and set again to about 20 Nm. Here, ICE 115 and M/G 120 are controlled to limit the rate at with each component reaches its respective, commanded positive and/or negative torque, to meet the demanded and adjusted engine torque 370 and M/G torque 385. For purposes of illustration, charge-torque-slew-rate limit 345 is adjusted to be greater than about 100 Nm/second (Nm/S) and less than about 2,000 Nm/S. It was observed that a slew-rate limit below about 100 Nm/S reduced responsiveness of powertrain 110 below acceptable driver perceived performance preferences, and higher than about 2000 Nm/S increased TDs beyond preferred DTs 315 of about 20 Nm.

During acceleration through first gear with bypass clutch unlocked, TD 400a (FIG. 4) is unexpectedly and surprisingly reduced to about 27 Nm, which is a substantial drop of about 88% or so in the TD detected at wheels 154 and output drive shaft 150. However, TD 400a still exceeds the 20 Nm of DT 315. Even so, an acceptable improvement is seen with respect to the remaining gears, wherein detected TDs 405a, 410a, 415a, 420a, 425a, 430a, and 435a are all below the preferred and/or predetermined DT 315 of about 20 Nm. As should be understood by those working in the field in view of the descriptions included elsewhere herein, DT 315 may be adjusted further in real-time and/or during operation of HEV 100 to enable higher and lower DTs 315 as torque-multiplier ratio 320 changes under varying operational conditions. Similarly, slew-rate-limit 345 may also be adjusted higher and lower to increase and decrease as may be preferred in response to changing DTs 315 and torque-multiplier ratios 320. For example, when driveline 105 torque-multiplier ratio 320 is lower during operation with higher gears of transmission 160, possible TDs will be less amplified and less noticeable to vehicle occupants, such that higher DTs 315 and slew-rate limits 345 may be permitted, which enables faster responses of ICE 115 and M/G 120 to more rapidly make torque power available for battery charging and to more rapidly respond to driver torque demands.

Figure 5:
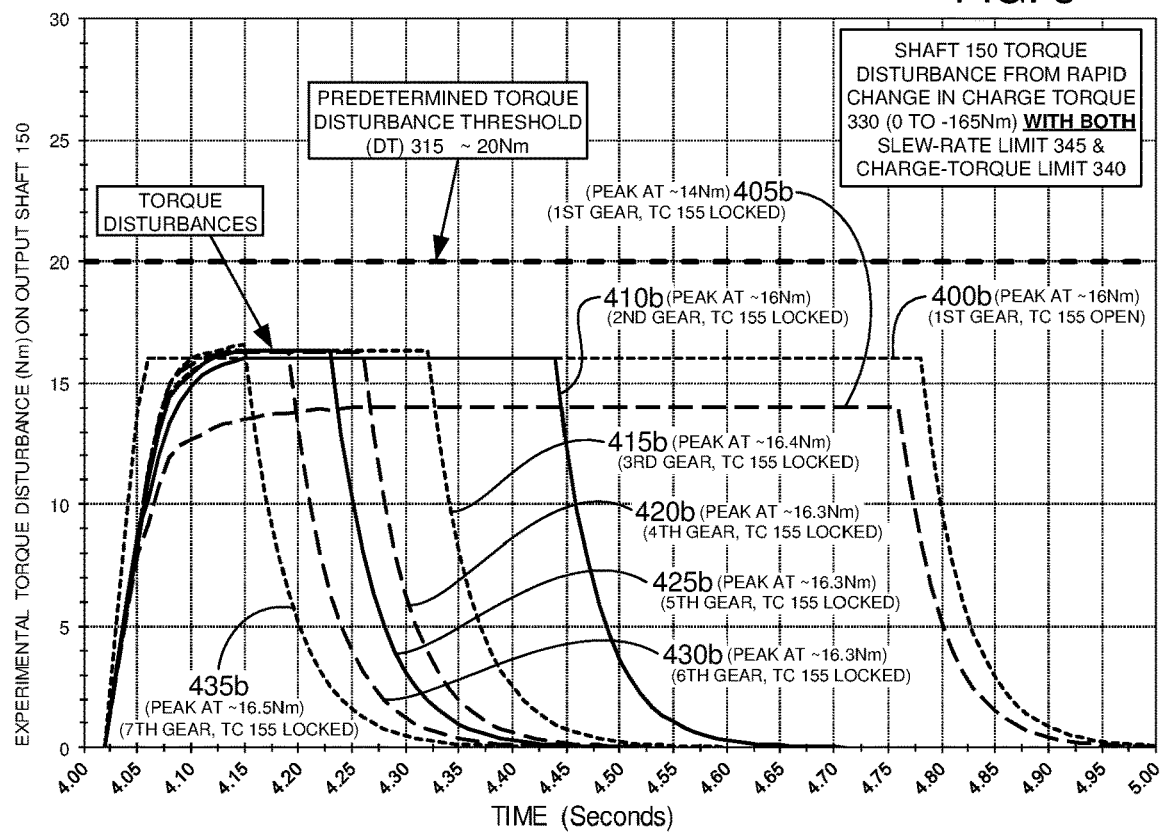
FIG. 5 depicts another example of experimental data of the vehicle of the preceding figures in operation with the prior methods and systems.

HEV 100 and its systems, controllers, and components were further modified for additional experiments to concurrently implement both charge-torque limit 340 and charge-torque-slew-rate-limit 345 during operation, and further TD detection data was accumulated from transmission output drive shaft 150 and wheels 154. This next experiment also utilized the same driver and charge torque demands of the earlier experiments and simulations. Application of both limits 340, 345 resulted in further improvements in TDs perceived and detected at wheels 154 and output drive shaft 150, as is illustrated in FIG. 5. Each of TDs 400b, 405b, 410b, 415b, 420b, 425b, 430b, and 435b, were below predetermined DT 315 of about 20 Nm. This next example illustrates that the TDs detected for all gears and operational conditions did not exceed about 20 Nm, and thus were all below predetermined DT 315 of 20 Nm. These more favorable experimental results are further described with added details in FIG. 5.

FIG. 6 depicts an exemplary slew-rate-limit calibration data set that was used in the preceding and subsequent examples and experiments to generate and adjust charge-torque-slew-rate limit 345 for the various torque-multiplier ratios 320 of driveline 105, during operation of HEV 100, and its controllers, components, and systems. To generate and establish a range of charge-torque-slew-rates 345 in Nm-Seconds (Nm-S) for the data set of FIG. 6, which depicts a comparable range of torque-multiplier ratios 320, HEV 100 was cycled through a range of operational conditions. The resultant driveline-transmission-torque-multiplier ratios 320 were measured and/or interpolated and simulated, to establish predicted, predetermined, and/or preferred charge-torque-slew-rate limits 345 for a range of such measured driveline-transmission-torque-multiplier ratios 320, and for preferred operational performance characteristics of HEV 100 (generated, adjusted, and stored, for example as additional VPPs 240).

With continuing reference to the preceding figures and descriptions, and now also to FIG. 7, data from the preceding experiments and the simulation of FIG. 3 was used for another experiment for operating HEV 100 on a dynamometer without implementation of torque and slew-rate limits 340, 345. HEV 100 was configured for operation in third gear of transmission 160 with bypass clutch 157 locked, and with powertrain 110 subjected to a constant driver acceleration demand that again results in a positive transmission-input-driver demand torque 335 of about 35 Nm. Also, a battery charge demand was used that also again results in a negative charge-torque signal of about −165 Nm or so. As with earlier experiments and simulations, this would be expected to result in a large divergence of positive and negative torque magnitude and slew-rate torque output demands in 3rd gear, for both ICE 115 and M/G 120. HEV 100 was then operated on the dynamometer, and torque outputs for engine 115 and M/G 120 were recorded, along with TDs detected about wheels 154 and output drive shaft 150.

The recorded data reflected predicted expectations arising from the simulation of FIG. 3, and the previous TD 415 (third gear, had a predicted TD 415 of about 55 Nm, FIG. 3). In this experiment, HEV 100 operation in third gear was close to predictions and gave rise to a maximum TD 415c of about 58 Nm, which was detectable in multiple pulsed or ringing peaks that damped to zero over about 1.4 s, and which is labeled in FIG. 7 as TD 415c, and as dampening subsequent pulses TD 415c1, TD 415c2, TD 415c3, TD 415c4, TD 415c5, and TD 415c6. An additional performance characteristic was also observed, and included a noticeable phase and magnitude anomaly in the respective measured torque output of engine 115 and M/G 120, wherein a delayed torque output surge was observed at about 27.5 s for engine 115 and about 50 milliseconds later at about 27.55 s for M/G 120. These observed phase and magnitude anomalies are believed to be typically due to the TDs as well as differing performance response times of the various components, controllers, communications delays in CAN 210, and other system noise due to changing temperature, barometric pressure, and other system variables, as explained previously.

With reference now also to FIG. 8, the preceding dynamometer experiment reflected in FIG. 7 is repeated with the same configuration, but this time with implementation of both charge-torque limit 340 and charge-torque-slew-rate-limit 345. Again HEV 100 is operated in third gear under the same prior conditions. The predetermined or preferred DT 315 of about 20 Nm, driver demand torque signal of about 35 Nm, and charge-torque-demand signal of about −165 Nm are used. As may be understood from FIG. 8, the maximum detected TD 415d is about 16 Nm, and is now well within the preferred operating range of DT 315 of about 20 Nm. Additionally, it may be understood by the skilled person that the respective slew-rates for engine 115 and M/G 120 are more gradual than those exemplified in FIG. 7 and the earlier experiment. Here, the more gradual slew rates for ICE 115 and M/G 120 span about 1,000 milliseconds (FIG. 8), compared to the more rapid slew rates of about 150 milliseconds (FIG. 7). Further, it was also discovered that TDs of this experiment, while detectable, were all less than and/or well within the preferred range of about 20 Nm. It was also observed that the phase and magnitude anomalies of the prior configuration and experiment were undetectable in this arrangement as is reflected in FIG. 8. Consequently, it should be apparent that implementation of the charge-torque limit signal 340 and the charge-torque-slew-rate limit signal 345 may enable substantial improvements in mitigating torque disturbances in HEV 100 and similar vehicles.

The descriptions herein refer to systems, methods, components, elements, nodes, or features being in "communication" and or "coupled" together. As used herein, unless expressly stated otherwise, use of these terms and words are intended and must be understood to mean that one system/method/sensor/actuator/component/element/module/feature is directly or indirectly coupled, joined to, and/or communicates with another, either electronically, mechanically, or both and in some similar way that enables cooperative operation and exchange and interchange of data and information.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, or to an exemplary item commercially available in the market as of a specific date and time period.

Instead, these descriptions are intended to be understood to include conventional, traditional, normal, or standard technologies that may be available now and at any time in the future in some improved and modified form according to the innovations described in this disclosure. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Similarly, a group of words linked with the conjunction "or" must not be understood as requiring mutual exclusivity among that group, but rather must also be understood as meaning "and or" unless expressly stated otherwise. Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
 a controller configured to:
  responsive to an increasing charge-torque, adjust a charge-torque limit and a slew-rate limit respectively with a torque-disturbance threshold and a slew-rate-calibration ratio, and
  responsive to an increasing driver demand torque, increase an engine torque constrained by the slew-rate limit, to meet a combined driver demand torque and a charge torque both constrained by the charge-torque limit, such that a battery-charge rate increases as the torque-disturbance threshold increases.

2. The vehicle according to claim 1, further comprising:
 a transmission coupled to the controller and an engine and an electric machine; and
 the controller further configured:
  to generate in response to the driver demand torque and a charge-torque signal;
  an engine torque signal combining the driver demand torque and the charge torque,
  an engine torque-output-estimate signal with an engine speed, an air intake, and a fuel consumption,
  an electric machine torque signal to equal the engine torque-output-estimate signal minus the driver demand torque, and
  to adjust the engine and the electric machine respectively with the engine torque and electric machine torque signals.

3. The vehicle according to claim 1, further comprising:
 a transmission having a plurality of selectable gears and coupled to an engine and an electric machine; and
 the controller further configured to adjust the torque-disturbance threshold with a transmission input speed and a transmission-torque-multiplier ratio adjusted by the transmission input speed and a selected gear of the plurality of selectable gears, such that the battery-charge rate increases as the transmission-torque-multiplier ratio decreases with higher selected gears of the plurality of selectable gears.

4. The vehicle according to claim 3, further comprising:
 the controller further configured to increase:
  the torque disturbance threshold as the transmission-torque-multiplier ratio decreases; and
  the charge-torque limit and the slew-rate limit as the torque-disturbance threshold increases, such that the battery-charge rate increases.

5. The vehicle according to claim 4, further comprising:
 the controller further configured:
 to generate in response to the driver demand torque and the charge-torque signal:
  an engine torque signal combining the driver demand torque and the charge torque,
  an engine torque-output-estimate signal from an engine speed, air intake, and fuel consumption,
  an electric machine torque signal to equal the engine torque-output-estimate signal less the driver demand torque, and
  to adjust the engine and the electric machine respectively with the engine torque and electric machine torque signals, such that a transmission torque output disturbance is less than or equal to the torque-disturbance threshold.

6. The vehicle according to claim 1, further comprising:
 a powertrain including an engine, an electric machine, and a torque convertor with a bypass clutch coupled to a transmission having a plurality of selectable gears; and
 the controller further configured to adjust:
  a transmission-torque-multiplier ratio from a speed of the torque convertor, an engagement position of the bypass clutch, and a selected gear of the plurality of selectable gears, and
  the torque-disturbance threshold from a transmission input speed and the transmission-torque-multiplier ratio, such that the battery-charge rate increases as the transmission-torque-multiplier ratio decreases with higher selected gears of the plurality of selectable gears.

7. The vehicle according to claim 6, further comprising:
 the controller further configured to increase:
  the torque-disturbance threshold when one or more of:
   (a) the bypass clutch is engaged, (b) the torque convertor operates at a torque ratio of less than or equal to approximately 1.2, and (c) the transmission-torque-multiplier ratio is less than or equal to approximately 1.5; and the charge-torque limit and the slew-rate limit as the torque-disturbance threshold increases.

8. The vehicle according to claim 1, further comprising:
a transmission coupled to an engine and an electric machine that is also coupled to a battery; and
the controller further configured to:
  receive a charge state from the battery,
  adjust a battery charge demand with the charge state and a predetermined charge state, and
  convert the charge demand to the charge torque to be less than or equal to the charge-torque limit, such that the battery-charge rate increases as the charge torque increases.

9. The vehicle according to claim 1, further comprising:
an engine coupled to an electric machine and a transmission; and
the controller further configured to:
  adjust the slew-rate-calibration ratio with a transmission-torque-multiplier ratio and the torque-disturbance threshold,
  adjust the slew-rate limit with the slew-rate-calibration ratio,
  adjust the charge-torque limit with the torque-disturbance threshold and the transmission-torque-multiplier ratio,
  generate an engine torque signal that is less than or equal to the charge-torque limit and which combines the driver demand torque and the charge torque,
  generate an engine output-torque estimate from one or more of an engine speed, an air intake, and a fuel consumption,
  generate an electric machine signal equal to the engine torque signal minus the engine output-torque estimate,
  adjust the engine torque and the electric machine torque with the respective engine torque signal and electric machine signal, and
  adjust a transmission output torque to thereby have torque disturbances less than or equal to the torque-disturbance threshold for a plurality of transmission-torque-multiplier ratios,
such that the battery-charge rate increases as the transmission-torque-multiplier ratio decreases.

\* \* \* \* \*